(12) United States Patent (10) Patent No.: US 8,884,949 B1
Lambert et al. (45) Date of Patent: Nov. 11, 2014

(54) METHOD AND SYSTEM FOR REAL TIME RENDERING OF OBJECTS FROM A LOW RESOLUTION DEPTH CAMERA

(76) Inventors: Thibault Lambert, Montreal (CA); Felix Roy, Montreal (CA); Frederic Blais, Montreal (CA); Olivier Henley, Montréal (CA)

( * ) Notice: Subject to any disclaimer, the term of this patent is extended or adjusted under 35 U.S.C. 154(b) by 498 days.

(21) Appl. No.: 13/153,880

(22) Filed: Jun. 6, 2011

(51) Int. Cl.
*G06T 15/00* (2011.01)
*G06T 15/50* (2011.01)
*G06K 9/00* (2006.01)

(52) U.S. Cl.
CPC .................................. *G06K 9/00369* (2013.01)
USPC .......................................... 345/419; 345/426

(58) Field of Classification Search
CPC combination set(s) only.
See application file for complete search history.

(56) References Cited

U.S. PATENT DOCUMENTS

| | | | |
|---|---|---|---|
| 6,353,678 B1 | 3/2002 | Guo | |
| 6,612,930 B2 | 9/2003 | Kawagoe | |
| 6,760,478 B1 | 7/2004 | Adiletta | |
| 7,006,698 B2 | 2/2006 | Adiletta | |
| 7,324,687 B2 | 1/2008 | Zitnick, III | |
| 7,352,358 B2 | 4/2008 | Zalewski | |
| 7,352,359 B2 | 4/2008 | Zalewski | |
| 7,391,409 B2 | 6/2008 | Zalewski | |
| 7,627,139 B2 | 12/2009 | Marks | |
| 7,928,977 B2 | 4/2011 | Tanimura | |
| 8,502,818 B1 * | 8/2013 | Mueller-Fischer | 345/420 |
| 2002/0158873 A1 | 10/2002 | Williamson | |
| 2004/0104935 A1 | 6/2004 | Williamson | |
| 2004/0131267 A1 | 7/2004 | Adiletta | |
| 2005/0085296 A1 | 4/2005 | Gelb | |
| 2005/0276329 A1 | 12/2005 | Adiletta | |
| 2006/0050087 A1 | 3/2006 | Tanimura | |
| 2006/0238549 A1 | 10/2006 | Marks | |
| 2006/0252541 A1 | 11/2006 | Zalewski | |
| 2007/0120979 A1 | 5/2007 | Zhang | |
| 2007/0242066 A1 | 10/2007 | Levy Rosenthal | |
| 2007/0260984 A1 | 11/2007 | Marks | |
| 2007/0268312 A1 | 11/2007 | Marks | |
| 2008/0001918 A1 | 1/2008 | Hsu | |
| 2008/0001951 A1 * | 1/2008 | Marks et al. | 345/474 |
| 2008/0009348 A1 | 1/2008 | Zalewski | |
| 2008/0186330 A1 | 8/2008 | Pendleton | |
| 2008/0215994 A1 | 9/2008 | Harrison | |
| 2008/0220867 A1 | 9/2008 | Zalewski | |
| 2008/0297593 A1 | 12/2008 | Debevec | |
| 2009/0021513 A1 | 1/2009 | Joshi | |
| 2009/0066690 A1 | 3/2009 | Harrison | |
| 2009/0153474 A1 | 6/2009 | Quennesson | |
| 2009/0209343 A1 | 8/2009 | Foxlin | |

(Continued)

FOREIGN PATENT DOCUMENTS

| | | |
|---|---|---|
| EP | 2044987 A1 | 4/2009 |
| EP | 2169622 A1 | 3/2010 |

(Continued)

*Primary Examiner* — Kee M Tung
*Assistant Examiner* — Leon T Cain, II (57) ABSTRACT

A method is disclosed for real time realistic rendering of objects and more specifically humans in a gaming environment from a single low resolution depth camera. The method is based on utilizing a personal computer or video game console such as Xbox 360 and a dept camera such as the Microsoft Kinect. The depth camera captures a depth signal that may be processed and used to generate a three dimensional mesh that is time coherent. The result may be used in any game engine due to the very low computation time achievement.

2 Claims, 7 Drawing Sheets

(56) References Cited

U.S. PATENT DOCUMENTS

| | | |
|---|---|---|
| 2009/0215533 A1 | 8/2009 | Zalewski |
| 2009/0262113 A1 | 10/2009 | Kotake |
| 2009/0284529 A1 | 11/2009 | De Aguiar |
| 2010/0045869 A1 | 2/2010 | Baseley |
| 2010/0048290 A1 | 2/2010 | Baseley |
| 2010/0060662 A1 | 3/2010 | Law |
| 2010/0086218 A1 | 4/2010 | Tateno |
| 2010/0214301 A1* | 8/2010 | Li et al. .................... 345/522 |
| 2010/0225743 A1 | 9/2010 | Florencio |
| 2010/0238182 A1 | 9/2010 | Geisner |
| 2010/0277489 A1 | 11/2010 | Geisner |
| 2010/0278393 A1 | 11/2010 | Snook |
| 2010/0289797 A1 | 11/2010 | Tateno |
| 2010/0303289 A1 | 12/2010 | Polzin |
| 2011/0053688 A1 | 3/2011 | Crawford |
| 2011/0085705 A1 | 4/2011 | Izadi |
| 2011/0090253 A1 | 4/2011 | Good |
| 2011/0098109 A1 | 4/2011 | Leake |
| 2011/0107220 A1 | 5/2011 | Perlman |
| 2012/0194645 A1* | 8/2012 | Fuller et al. .................... 348/46 |

FOREIGN PATENT DOCUMENTS

| | | |
|---|---|---|
| EP | 2306399 A2 | 4/2011 |
| WO | WO2007130582 A2 | 11/2007 |
| WO | WO2010020739 A1 | 2/2010 |
| WO | WO2010036989 A1 | 4/2010 |
| WO | WO2010037512 A1 | 4/2010 |
| WO | WO2010102288 A2 | 9/2010 |
| WO | WO2010128329 A2 | 11/2010 |

* cited by examiner

METHOD AND SYSTEM FOR REAL TIME RENDERING OF OBJECTS FROM A LOW RESOLUTION DEPTH CAMERA

TECHNICAL FIELD

The present specification relates to the field of real time computer based image rendering and video gaming. This specification also relates to the augmented reality field.

BACKGROUND

Mesh generation based on a video signal usually involves several digital cameras, each one recording a signal. Then a computer analyzes the video signals to interpolate the depth of every point in space and generate a three dimensional geometry representing the player being recorded. Unfortunately, most of today's algorithms may be computationally expensive to implement and most may be prone to errors, since the video signals may be too complex to analyze in many situations and generate real-time realistic rendering of objects.

A new generation of cameras have become available that obtain depth information directly from what is referred to as "depth sensor" in the camera. Microsoft Kinect, for example, is one of these new generation cameras. Based on infrared technology, Kinect computes the depth of the objects in its field of view, just as a regular camera would capture the color of the objects in its field of view and outputs a two dimensional grid of points. Moreover, this next generation of cameras have a lower cost than the prior generation.

The construction of a three dimensional mesh from a two dimensional depth signal is relatively easy and less prone to errors provided there is a quality video signal. One skilled in the art will note that the signal from the new generation cameras is usually noisy, both spatially and temporarily, and its quality depends on several external conditions. For the present specification, noise in a signal is the random variation of depth information, produced by the sensor and circuitry of the camera. Previous implementations have been unable to deliver a quality good-looking and stable mesh from next generation cameras.

Moreover, video games often use avatars as a representation of the player in the game. Recently, new hardware in consoles has allowed games to move the avatar or make it react to the actual movements of the player, introducing augmented reality in such applications. A full three dimensional representation of the player has generally been too expensive and not visually acceptable to appear in games.

Hence, it would be beneficial if a real-time realistic rendering of objects could be generated from the new generation of depth cameras, at a reasonable cost.

SUMMARY

A method for real time realistic rendering of objects and more specifically humans in a gaming environment from a single low resolution depth camera. The method is applied on a camera with a depth sensor and which is able to relay the information to a computer or a console. The output signal from the camera sensor is processed by software in order to generate a visually correct and time coherent three dimensional mesh that may be used by any three dimensional rendering software. An embodiment of the proposed method relates to the extreme low cost of the computation required to prepare and execute the realistic three dimensional rendering by using of the power of the graphics processing unit (GPU).

The three dimensional mesh is dynamically constructed real-time every frame based on the captured image. The method includes the steps of receiving a post-processed signal in a texture; writing to vertex buffer from a vertex shader; culling unused vertices; creating an index buffer from vertex shader using HistoPyramid algorithm; computing geometry with marching squares to generate isolines; computing normals of the mesh; and outputting a fully computed mesh.

BRIEF DESCRIPTION OF THE DRAWINGS

The components in the figures are not necessarily to scale, emphasis instead being placed upon illustrating the principles of the present specification. In the figures, like reference numerals designate corresponding parts throughout the different views.

DETAILED DESCRIPTION

A method and system are described for generating a real-time realistic rendering of objects from a single low resolution depth camera. The present specification discloses particular embodiments with specific hardware for console video games. The present specification is intended to cover alternatives, modifications and equivalents, which may be included within the spirit and scope of the present specification as defined by the appended claims.

For the purposes of the present specification the following definitions apply.

The following are considered equivalent terms: geometry, mesh, constructed geometry, computed geometry, mesh computation. A mesh or geometry is a collection of vertices, edges and faces that defines the shape of a polyhedral object in 3D computer graphics.

Figure 1:
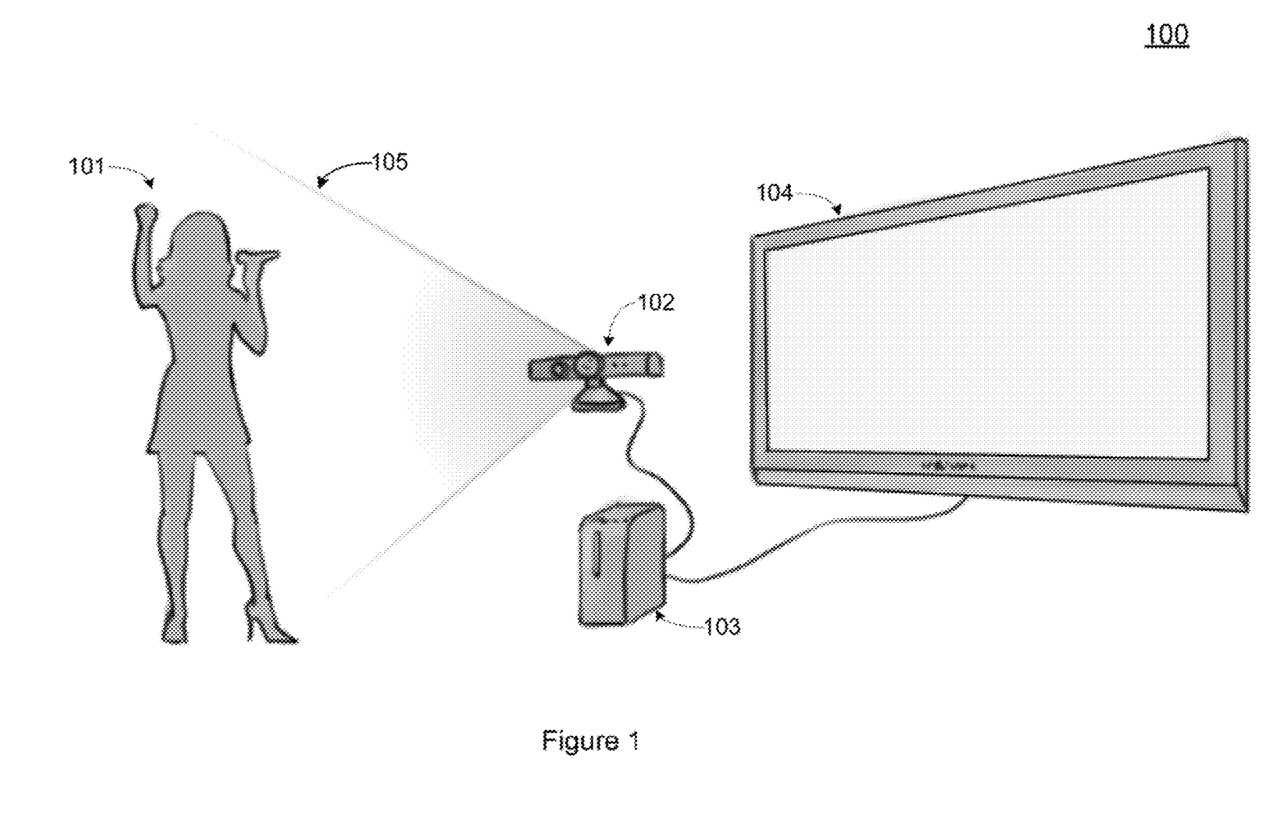
FIG. 1 is a perspective view of an exemplar set up of a gamer playing in front of her console and her television. The depth camera is capturing her movements and is transmitting the signal to the console which will process it and generate the final output which will be displayed on the television.

A single low resolution depth camera 102 captures an image and is sometimes referred to as a "depth camera". This image is transmitted in the form of a signal or video signal to the computer or console 103. In the computer, the image or signal is processed, resulting in a post-processed signal. Low resolution refers to a camera that provides a video signal which contains less information than the common High Definition (HD) standard with a resolution of 1280×720. An embodiment of a depth camera is incorporated in a Microsoft Kinect.

A depth sensor is able to capture the depth of objects that are in its field of view. The sensor outputs an image in which each pixel stores the captured depth relative from its position.

Noise in a signal is the random variation of depth information, produced by the sensor and circuitry of the camera.

A graphics processing unit (GPU) is a specialized hardware circuit designed to accelerate the building of images to be rendered on a display. Their highly parallel structure makes them efficient for algorithms that can be executed in parallel. Images are computed with what is called the rendering pipeline. An embodiment of a GPU is a NVIDIA graphic card.

To render images, the GPU needs a vertex buffer which is an array of data that contain information about the positions of the points forming the mesh. The vertex shader processes each point in parallel during the rendering pipeline and output the result to the next step of the pipeline.

An isoline is a curve along which a function has the same value. In the context of the proposed method, the function is telling if the pixel of the processed image is white i.e. contains depth information or not.

A line is considered as non blocky when its shape doesn't look like blocks. The line must be mathematically continuous i.e. a simple unbroken curve with no spatial holes or jumps. Isolines by definition respect this non blocky condition.

The proposed method uses some filters which are algorithms that are well know to those of ordinary skill in the art. Descriptions of each algorithm are given in following paragraphs.

Median filter or blur filter are filters that provide per-pixel denoising and anti-aliasing. One embodiment is a bilateral blur filter.

Spatial bilateral filter is also referred to as spatial bilateral smoothing.

Embodiments of the present specification may be implemented on different hardware, for example any video game console such as Microsoft's Xbox 360 or Sony's PS3 or a suitably configured PC. The optimisation component may differ a little but the concept is the same. The details of the software implementation will be given for the Microsoft's Xbox 360 console.

Embodiments of the present specification also include a camera with a depth sensor. This specification describes how to take advantage of the Microsoft Kinect, which is fully and conveniently adapted to the game console. The depth information is passed to the software application by giving a set of points in a grid, each point corresponding to a depth in millimeters.

Further embodiments of the present specification include a camera with a grid of 320×240 points which is small compared to the common High Definition (HD) standard, 1280× 720 (also known as 720p) or even larger 1920×1080 (also known as 1080p). Thus, the video signal from a camera with a grid of 320×240 lacks accuracy and high resolution, especially considering that the computed mesh may be displayed in a HD game engine. This video signal from the 320×240 points camera is referred as being of low resolution. A low computation cost may be difficult to achieve due to the low resolution of the depth camera and its noisy signal.

As described, the resolution of the set of points is 320×240 which is low definition as compared with the HD standard. Moreover, the transmitted signal is noisy so the video signal needs to be processed before it may be used for generating a mesh.

Embodiments of the present specification may allow players to be seen in a three dimensional augmented reality, to be in the game with the software acting as a mirror. The player may see a perfect representation of her in the game and is able to control her movements more naturally and easily. These embodiments may be perfect for software applications or video games such as sports games or physical therapy programs where the player needs to be aware of the player's body.

FIG. 1 is a perspective view of set up 100 of a player 101 playing in front of a console 103 and a television 104. The single low resolution depth camera 102 is capturing three-dimensional information of the objects in its field of view 105 and transfers the resulting signal to the console 103 or a personal computer. The signal is processed by software which also computes a mesh from it. A mesh is a collection of vertices, edges and faces that define the shape of a polyhedral object in 3D computer graphics. This resulting mesh is then displayed with any rendering software on the television 104.

Figure 2:
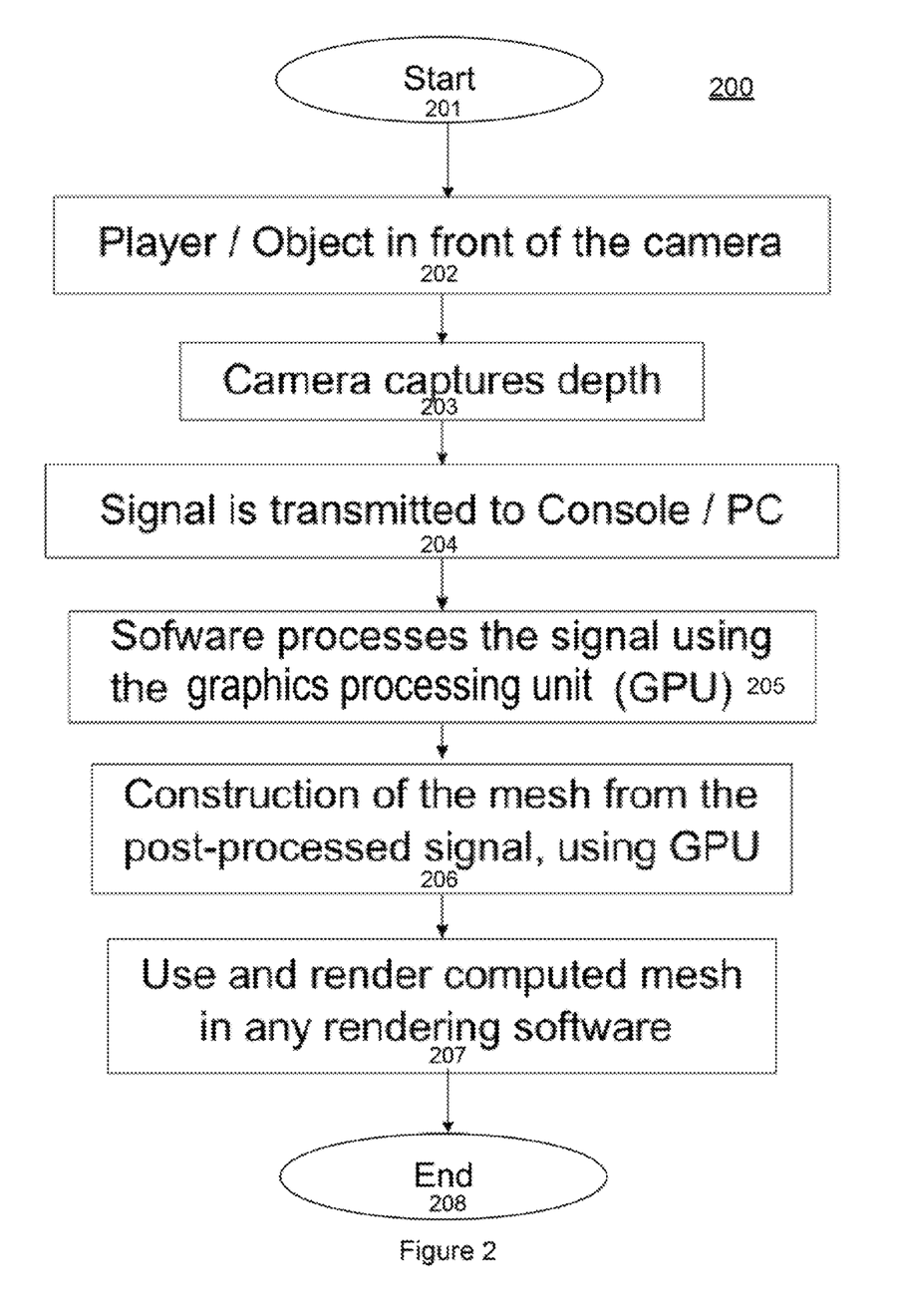
FIG. 2 is a flow chart depicting the main steps of the method to generate a real-time realistic rendering of objects from a single low resolution depth camera.

FIG. 2 is flow chart 200 showing the process of generating a real-time realistic rendering of objects from a single low resolution depth camera 102. The player 101 or object needs to be in front of the camera per step 202. The depth sensor of this camera captures the depth per step 203, and transmits a signal to the console per step 204. The software receives this signal and processes it per step 205, taking advantage of the parallel processes of the Graphics Processing Unit (GPU) of the console. Step 205 is further described in FIG. 3, step 301 to step 307. A three dimensional mesh is constructed in step 206 by also using the GPU power. (Step 206 will be further described in FIG. 7, steps 701-707.) Then the resulting mesh is sent to the graphic pipeline and rendered like any other virtual object of the game world per step 207. Although the processing is very intensive and expensive, optimizing the algorithm with the proposed method allows the computation time to be less than 6 ms using Microsoft Kinect and Microsoft Xbox 360. Video games need to render graphics at 30 frames per second, so one frame needs to be generated in less than 33 ins. This 33 ms is 1 second/30 times=33 ms, it is a generic time for a PC, Xbox, PS3, Wii or similar devices. The proposed process may then be integrated in any application with minimal compromises.

Due to the low resolution and the low quality of the captured signal, it contains a lot of noise that needs processing. As explained before, noise is a random modification of the signal produced by the imperfect sensor and circuitry of the camera. With depth information, the noise is responsible for random spatial and temporal flickering. Though always present, this randomness is excessive and problematic due to the low resolution of the camera. Smoothing over time is not acceptable because body movements may be fast and most cameras such as Kinect are only able to give information on what they capture every 33 ms. A lot of activity may happen during this time period, so in order to be able to get a stable signal, the signal needs to be temporally fixed. The method minimizes temporal latency while achieving a realistic result. A realistic result may be considered the computed geometry being visually recognizable by the player with similar qualities as if she looked at an image in a mirror.

In summary, FIG. 2. illustrates a method for real time realistic rendering of objects comprising the steps starting at step 201:

Step 202—positioning an object in front of a low resolution camera;

Step 203—capturing an image with the single low resolution camera, wherein the single low resolution camera has a depth sensor;

Step 204—transmitting the image as a signal to a computer;

Step 205—processing the signal using software processes in a graphics processing unit (GPU);

Step 206—constructing dynamically a three dimensional mesh real-time every frame based on the post-processed signal of the captured image, utilizing the graphics processing unit;

Step 207—using and rendering the three dimensional mesh in rendering software.

Step 206 specifies "constructing dynamically a three dimensional mesh every frame". By performing the calculation every frame, latency is reduced for the computed mesh. However, step 206 may be performed with a calculation less frequent than "every frame".

Figure 3:
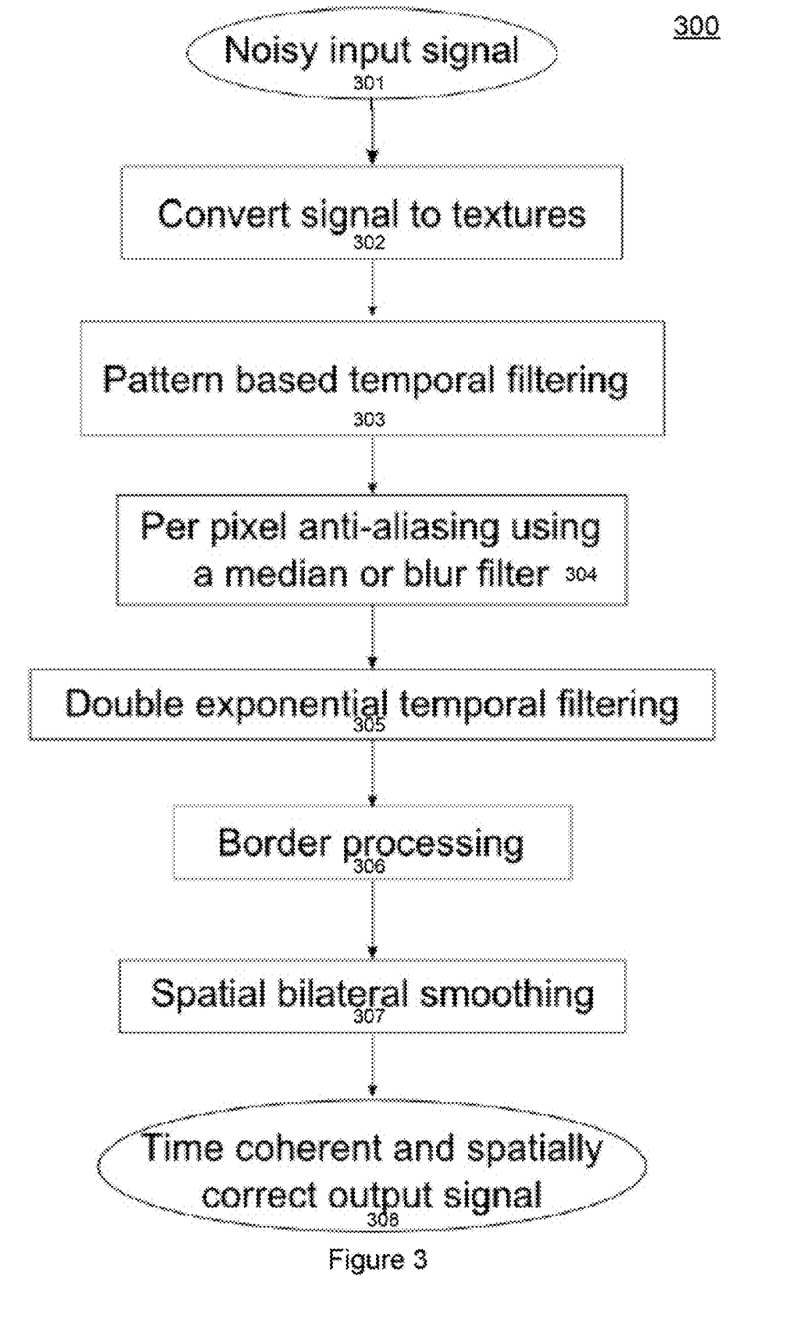
FIG. 3 is a flow chart detailing the steps to convert the noisy signal received from the depth camera into a time coherent and spatially correct output signal.

FIG. 3 is flow chart 300 that shows the details related to step 205 of the proposed algorithm. Getting a stable and precise signal requires several algorithms. First, the signal needs to be temporally filtered with a pattern algorithm per step 303. (Step 303 is described further in FIG. 4A and FIG. 4B, steps 411-425.) Then, per pixel anti-aliasing is performed using a median or blur filter in step 304. A double exponential temporal filter is then added in step 305. The border information needs to be processed separately to create a continuous and coherent behaviour per step 306. Finally the coarse signal needs to be spatially smoothed using the principle of bilateral filtering in order not to process pixels that are located on the border of the player or object in the video signal per step 307. This process is referred to as spatial bilateral smoothing or spatial bilateral filtering.

In order to take advantage of the GPU capacities, the system stores the data of the signal in textures in step 302, surfaces that are graphic-friendly. This way, each pixel of the texture may be processed in parallel. That is, the system utilizes textures to process input data and the input data includes a depth signal.

Figure 4A:
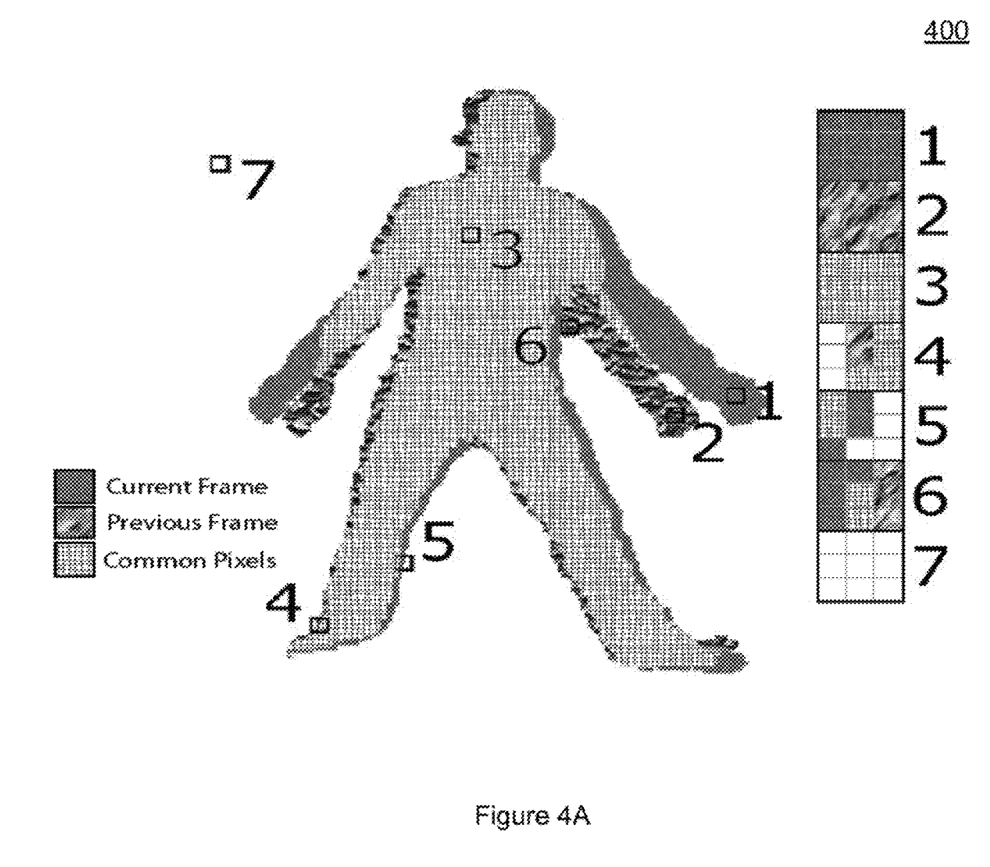
FIG. 4A illustrates the pattern based temporal filter and the seven possible pattern cases.

First, the current signal is compared to the previous signal with a pattern based algorithm per step 303. This pattern based algorithm is illustrated in pictorial 400 in FIG. 4A and flow chart 410 of FIG. 4B. FIG. 4A shows an overlay of two textures coming from the signal of the camera, one from the previous frame (next to last received signal) represented with wave patterns and one from the current frame (last received signal) in step 411 represented as gray. The previous frame is actually used only the first time, and after that the last result of the algorithm of step 412 is used. Each picture element, also known as a pixel, is treated individually per step 413. If a pixel belongs to both previous and current frame, it is referenced as "Common" and represented with a hatched pattern. With regards to its height immediate neighbours in step 414, seven different cases are identified (step 415 to step 422). These steps include cases 1 through case 7. Depending on the current state of the pixel of step 411 and its previous state in step 412, one may either add the pixel to the result in step 423 or remove it in step 419. This algorithm discriminates the status of a new set of depth points.

Figure 4B:
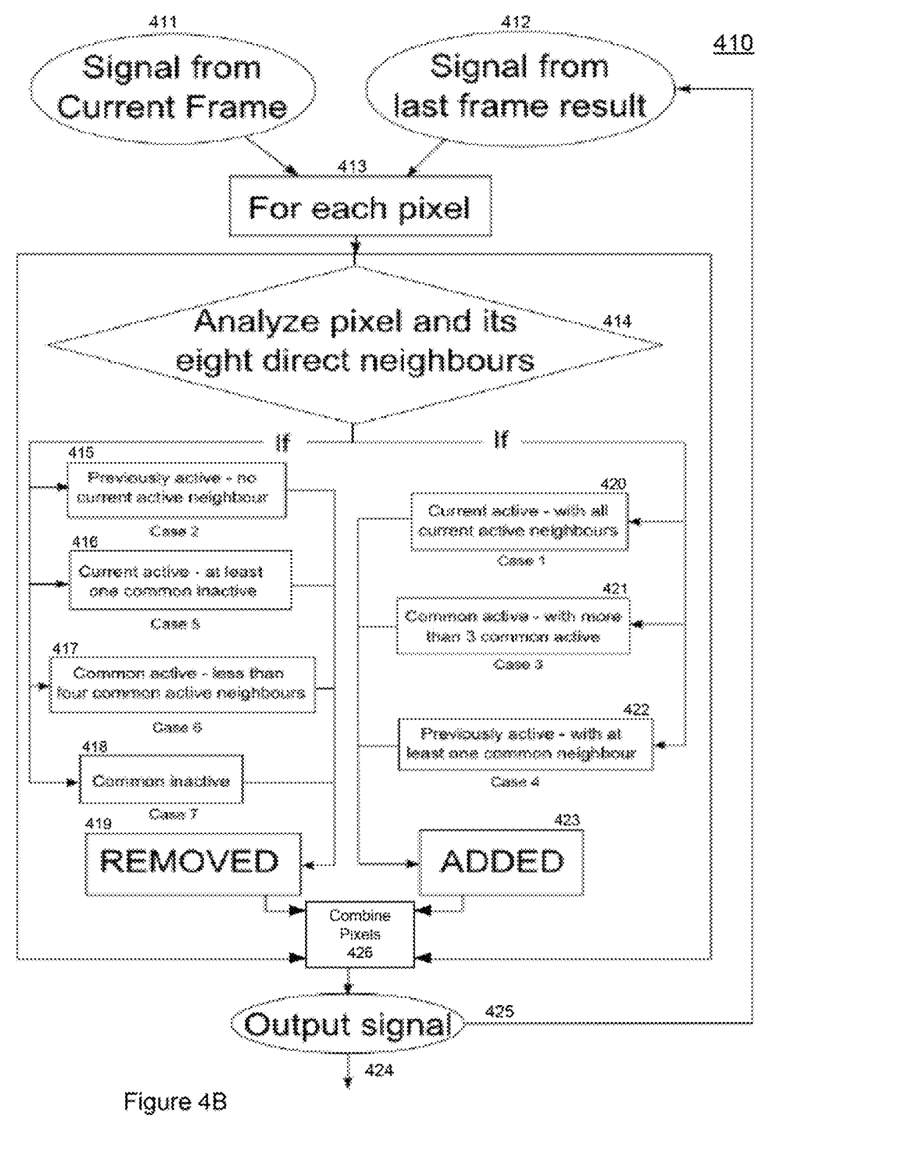
FIG. 4B illustrates a flow chart for the seven cases of the pattern-based temporal filtering.
Figure 5A:
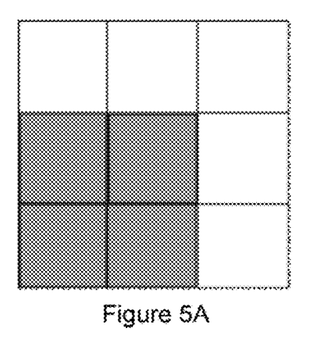
FIGS. 5A, 5B and 6A, 6B are examples of per-pixel anti-aliasing using a median or blur filter.
Figure 5B:
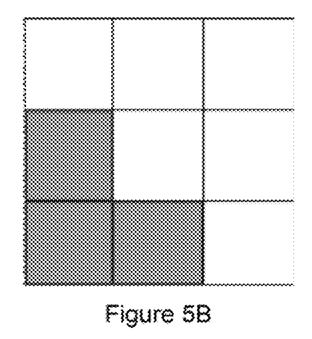
Figure 6A:
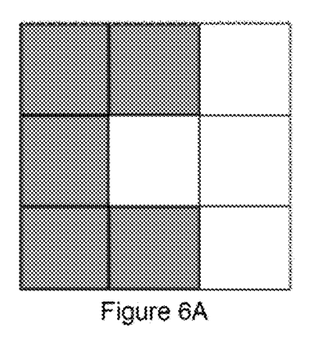
Figure 6B:
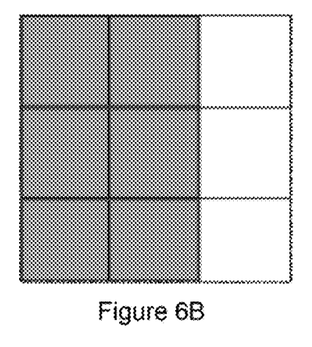

In summary, FIG. 4B describes further details related to step 303 where filtering the signal with pattern based temporal filtering is performed. The detail steps comprise:

Step 411, Step 412 and Step 413—combining "signal from current frame" and "signal from last frame result" for each pixel generating a first output;

Step 414—analyzing the first output and its eight direct neighbours

Step 415 to 423—determining active status,

Step 415—if (1) previously active with no current active neighbour (Case 2), or

Step 416—(2) currently active with at least one common inactive (Case 5), or

Step 417—(3) common active with less than four common active neighbours (Case 6), or Step 418—(4) common in (Case 7), Step 419—then remove pixel;

Step 420—if (5) currently active with all current active neighbours (Case 1), or Step 421—(6) currently active with more than 3 common active (Case 3), or Step 422—(7) previously active with at least one common neighbour (Case 4), Step 423—then add pixel, Step 424—outputting a temporally fixed signal, Step 425—coupling this output to an input of the "signal from last frame result" that will be used during the next frame.

Note: Steps 419 and 423 include generating algorithm output signal.

The mathematical representation for step 424 is

Step 424={OUTPUT|

FOREACH Step 413 DO Step 414

OUTPUT=Step 419 OR Step 423}

In other words, Step 424 is the set of outputs such that: for each Step 413, do Step 414. Output is the result of Step 414 (and its value can either be Step 419 or Step 423). Step 424 is a combination of this result for all the pixels, as noted in block, combine pixels 426.

The result is then reprocessed to fix degenerate pixels and aliasing in step 304. FIGS. 5A, 5B and 6A, 6B are examples of per-pixel anti-aliasing using a median or blur filter. The current center pixel value (FIGS. 5A and 6A) is compared with its neighbours by using a blur or a median filter as well known to those of ordinary skill in the art. The pixel may be either removed (FIG. 5B) or added (FIG. 6B) based on the result of the algorithm. If added (FIG. 6B), the new depth value is an average of its active neighbour values. The output texture per 424 is used during the next frame per step 425, allowing a continuous time accumulation which makes the results more stable. Thus, the system performs a per pixel anti-aliasing using a median or blur filter.

Another algorithm is used to enhance temporal coherence of the signal, i.e. reduce temporal noise coming from the signal by predicting and averaging the current position of a vertex from its position during the last frame. The double exponential temporal filtering per step 305, a much faster and cheaper alternative to the Kalman filter that is quite as efficient, is used. Thus, by utilizing a pattern based algorithm and a double exponential filter, the temporal noise of input signal may be reduced.

Border pixels are essential because the computed geometry is particularly visible on these locations as soon as the virtual camera moves and is at a different location from the actual camera. The proposed method reduces spatial noise of the depth sensor by spotting border pixel and then aggressively smoothes those pixels with a blur filter or median filter. A spatial relocation of border pixels is then executed in step 306. Thus, post-processing of the textures includes processing border pixels and per pixel anti-aliasing.

The final step of the signal processing comprises the smoothing of the coarse and noisy signal in order to obtain smooth spatial gradients, removing local incoherencies and averaging the depth information. The Kinect camera is not able to give more accuracy than a pixel every 4 cm of depth. It is essential not to process the border pixels previously found and not to average the current body pixel with neighbour pixels which may not belong to the object or player 101. This is a description of a simplified bilateral filtering which is a weighted blur filtering, the weight depending on the value of the pixel, per step 307. Thus, the steps include utilizing textures to process input data, where the input data comprises a depth signal, and using bilateral blur filter to smooth gradients.

Figure 7:
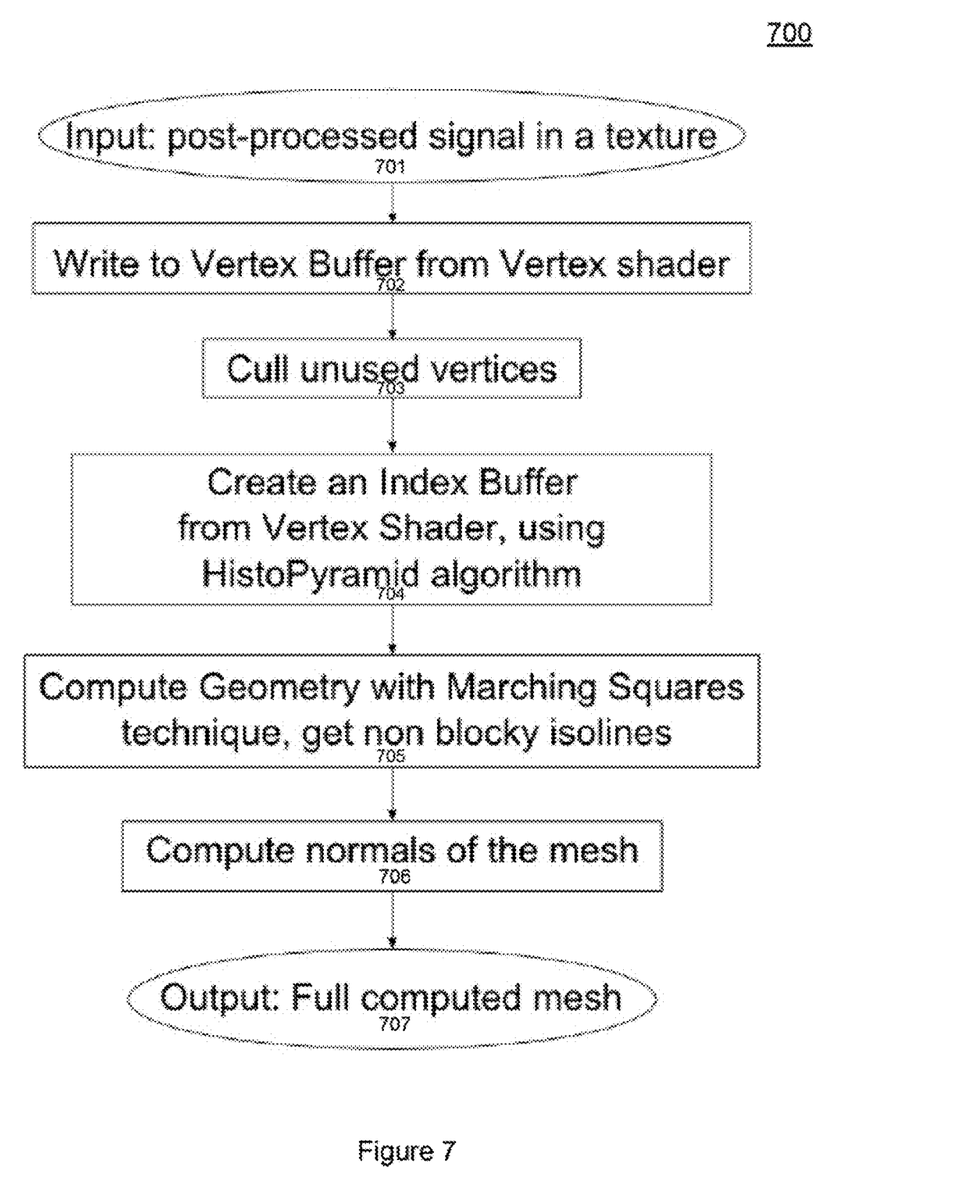
FIG. 7 is a flow chart illustrating the different steps of the constructed geometry (i.e. mesh).

The output of FIG. 3 is the combination of steps from step 301 to step 308. The resulting texture in step 308 is now temporally fixed and coherent and the spatial information is smoothed allowing the computation of a realistic gradient from the pixel values that will be visible when applying lighting on the final computed mesh. The output of step 308 may be used for input from step 701, the next major part of the proposed method.

In summary, FIG. 3 illustrates the details for step 205 where processing the signal using software processes in a graphics processing unit is preformed. The detail steps comprise:

Step 301—receiving a noisy input signal
Step 302—converting the signal to textures;
Step 303—filtering the signal with pattern based temporal filtering;
Step 304—performing per pixel anti-aliasing using a median or blur filter;
Step 305—filtering the signal with double exponential temporal filtering;
Step 306—processing borders of image of processed signal;
Step 307—processing the image with spatial bilateral smoothing; and
Step 308—outputting a time coherent and spatially correct signal.

One embodiment of the present specification comprises the rendering of a realistic mesh in a next generation console, meaning with a high definition rendering from a low resolution post-processed signal. The method proposes using several render passes with the graphic hardware to be able to generate such a three dimensional mesh and apply dynamic real time triangulation every frame. The Xbox 360 hardware Memory Export feature, or equivalent hardware, is used to dynamically write into a vertex buffer from a vertex shader during a rendering pass in step 702. This element is the key feature of the speed of the algorithm. The visual quality of the generated mesh is assured by the computation of isolines from the input textures representing the depth information. The graphics processing unit may construct the vertex buffer every frame, or optionally on a basis that is less frequent than every frame as long as the latency doesn't hamper realism.

The mesh is constructed from a 320×240 grid of 3D points. FIG. 7 illustrates flow chart 700 of the steps during the mesh computation. The algorithms of FIG. 7 are processed in a few milliseconds due to the benefits of the graphics processing unit and the parallel processing power of the hardware.

Moreover, vertex displacement during vertex processing is used in rendering pipeline to adjust the depth of constructed mesh per step 702. The pixels where depth is detected are first found and the remaining pixels are used to cull all unused vertices from the original grid per step 703.

An essential part of the proposed method is using the histoPyramid algorithm per step 704 which is a fast and GPU-friendly algorithm able to deal with a grid of points and to construct an optimized list of indexed points of the geometry. This compaction of the index buffer implies rendering the resulted mesh twice as fast because from a 320×240 i.e. 76800 points grid, the algorithm usually outputs a list of less than half that size. Furthermore, the Xbox 360 needs to split rendering of objects with more than 65536 vertices, almost doubling the cost of the rendering. So this histoPyramid optimization is mandatory for performance reasons.

The marching squares algorithm is then applied to get a smooth contour from this two dimensional grid per step 705, it is a well known computer graphics algorithm which is fast and efficient. Its last part applies a linear interpolation on the result, allowing the computed isoline to be continuous and not aliased like the signal received from the camera.

The resulting mesh just lacks normals so that it may be integrated in any game engine with any shading and rendering technique. Shading the constructed geometry may be applied on a per pixel basis. Another pass is used to compute the normals from the vertices per step 706. This is also done using the rendering pipeline. The result is stored in a texture accessible as a regular normal map during the final rendering of the mesh.

In summary, FIG. 7 illustrates the details of step 206 where constructing dynamically a three dimensional mesh real-time every frame based on captured image is performed. The detailed steps comprise:

Step 701—receiving a post-processed signal in a texture;
Step 702—writing to vertex buffer from a vertex shader;
Step 703—culling unused vertices;
Step 704—creating an index buffer from vertex shaders using HistoPyramid algorithm;
Step 705—computing geometry with marching squares to generate non blocky isolines;
Step 706—computing normals of the mesh; and
Step 707—outputting a fully computed mesh.

Thus, the computed mesh in step 707, shown as the output of FIG. 7, may be used in any part of the rendering, e.g. shadow pass, reflection pass and regular pass. Any shading technique may be applied on it because the rendering information was computed: vertex position, normals, texture coordinates. It may obviously be rendered from any virtual point of view, although the mesh is not closed because there is no available information on the back of the player so the illusion of a complete mesh may be achieved if the camera does not go around the player.

A system for real time realistic rendering of objects comprises: a single low resolution depth camera 102, wherein the single low resolution camera has a depth sensor, and wherein the single low resolution camera captures an image; a console 103 comprising a graphics processing unit (GPU) wherein the graphics processing unit processes the image with software algorithms; and the software algorithms, wherein the software algorithms compute a mesh from the post-processed image.

The system further comprises: a pattern based temporal filter; a median or blur filter; a double exponential temporal filter; and a spatial bilateral smoothing, wherein a time coherent and spatially correct output signal is generated.

The system further comprises: a vertex buffer and vertex shader; a HistoPyramid software algorithm to create an index buffer from the vertex shader; a marching squares software algorithm to compute geometry and obtain non blocking isolines.

While various embodiments of the Specification have been described, it will be apparent to those of ordinary skill in the art that many more embodiments and implementations are possible that are within the scope of this Specification. For example, any combination of any of the systems or methods described in this disclosure is possible.

We claim:
1. A method for realistic rendering of objects comprising the steps of:
positioning an object in front of a single low resolution depth camera;

capturing an image with the single low resolution depth camera;
transmitting the image as a signal to a computer;
processing the signal using software processes in a graphics processing unit;
constructing dynamically a three dimensional mesh real-time every frame based on captured image;
utilizing a graphics processing unit to construct the three dimensional mesh; and
using and rendering the three dimensional mesh in rendering software;
receiving a noisy input signal;
converting the signal to textures;
filtering the signal with pattern based temporal filtering;
performing per pixel anti-aliasing using a median or blur filter;
filtering the signal with double exponential temporal filtering;
processing borders of image of processed signal;
processing, the image with spatial bilateral smoothing; and
outputting a time coherent and spatially correct signal;
combining "signal from current frame" and "signal from last frame result" for each pixel, generating a first output;
analyzing the first output and its eight direct neighbours;
determining active status,
    if (1) previously active with no current active neighbour, or
    (2) currently active with at least one common inactive, or
    (3) common active with less than four common active neighbours, or
    (4) common in,
then remove pixel,
if (5) currently active with all current active neighbours, or
    (6) currently active with more than 3 common active, or
    (7) previously active with at least one common neighbour,
then add pixel;
generating algorithm output signal; and
coupling this output to an input of the "signal from last frame result" that is used during the next frame.

2. The method as in claim 1 wherein constructing dynamically a three dimensional mesh real-time every frame based on captured image further comprises the steps of:
receiving a post-processed signal in a texture;
writing to vertex buffer from a vertex shader;
culling unused vertices;
creating an index buffer from vertex shader using HistoPyramid algorithm;
computing geometry with marching squares to generate non blocky isolines;
computing normals of the mesh; and
outputting a fully computed mesh.

\* \* \* \* \*